(12) United States Patent
Ahlstedt et al.

(10) Patent No.: US 8,615,356 B2
(45) Date of Patent: Dec. 24, 2013

(54) ELECTROMECHANICAL STABILIZATION OF IN-LINE WHEELED VEHICLES

(75) Inventors: Delbert A. Ahlstedt, Lexington, SC (US); David C. Brillhart, Orlando, FL (US); Steven M. Krekeler, Blue Springs, MO (US); Steven R. Ragan, Farmington Hills, MI (US); Matthew A. Rice, Medway, MA (US)

(73) Assignee: International Business Machines Corporation, Armonk, NY (US)

( * ) Notice: Subject to any disclaimer, the term of this patent is extended or adjusted under 35 U.S.C. 154(b) by 498 days.

(21) Appl. No.: 12/887,759

(22) Filed: Sep. 22, 2010

(65) Prior Publication Data

US 2012/0072099 A1  Mar. 22, 2012

(51) Int. Cl.
  *G06F 17/10* (2006.01)
  *G06G 7/48* (2006.01)

(52) U.S. Cl.
  USPC .............................. 701/124; 701/36; 701/41

(58) Field of Classification Search
  USPC ............... 701/36, 41, 124; 700/279; 188/350;
    180/6.2–6.7, 400–447; 105/4.4;
    280/217, 293
  See application file for complete search history.

(56) References Cited

U.S. PATENT DOCUMENTS

| | | | | |
|---|---|---|---|---|
| 3,410,357 A * | 11/1968 | Summers | ...................... | 180/209 |
| 3,787,066 A * | 1/1974 | Hautier | ........................ | 280/217 |
| 3,804,455 A * | 4/1974 | Gorski | ......................... | 296/205 |
| 5,314,034 A * | 5/1994 | Chittal | ............................ | 180/21 |
| 5,349,945 A * | 9/1994 | Wass et al. | ............... | 128/200.23 |
| 5,701,965 A | 12/1997 | Kamen et al. | | |
| 5,971,091 A | 10/1999 | Kamen et al. | | |
| 5,975,225 A | 11/1999 | Kamen et al. | | |
| 6,112,840 A * | 9/2000 | Forbes | ......................... | 180/193 |
| 6,367,817 B1 | 4/2002 | Kamen et al. | | |
| 6,488,295 B1 | 12/2002 | Bryant | | |
| 7,195,487 B2 * | 3/2007 | Robbins | ......................... | 434/61 |
| 7,314,225 B2 * | 1/2008 | Murnen et al. | ................ | 280/217 |
| 7,350,787 B2 | 4/2008 | Voss | | |
| 7,597,337 B2 * | 10/2009 | Murnen et al. | ................. | 280/217 |
| 7,610,131 B2 * | 10/2009 | Kojima | .......................... | 701/38 |
| 8,251,390 B2 * | 8/2012 | Reichstetter et al. | ......... | 280/217 |
| 2004/0040756 A1 * | 3/2004 | Nmngani | ...................... | 180/6.2 |
| 2004/0098185 A1 * | 5/2004 | Wang | .............................. | 701/70 |
| 2004/0118622 A1 * | 6/2004 | Morrell et al. | .............. | 180/65.1 |

(Continued)

FOREIGN PATENT DOCUMENTS

| | | | | |
|---|---|---|---|---|
| GB | 2465020 A * | 5/2010 | ............ | B62D 37/06 |
| WO | WO 2008072043 A1 * | 6/2008 | .............. | B62H 1/10 |

OTHER PUBLICATIONS

Akinlua et al., Gyroscopic Stabilization of Unstable Vehicles, Apr. 2007, Department of Mechanical Engineering, University of Michigan, pp. 1-55.*

(Continued)

*Primary Examiner* — Khoi Tran
*Assistant Examiner* — Jaime Figueroa
(74) *Attorney, Agent, or Firm* — Brown & Michaels, PC

(57) ABSTRACT

A system and method to enhance stability of in-line wheeled vehicles throughout an entire range of vehicle motions that utilizes a stability control that is user controlled to adjust the amount of stability control that is in place at any given time. A electromechanical gyroscopic stabilization device assists in maintaining an appropriate attack angle of the in-line wheeled vehicle while approaching and during non-linear maneuvers.

4 Claims, 5 Drawing Sheets

(56) References Cited

U.S. PATENT DOCUMENTS

| | | |
|---|---|---|
| 2004/0254702 A1 | 12/2004 | Mueller |
| 2006/0064223 A1 | 3/2006 | Voss |
| 2006/0085111 A1* | 4/2006 | Kojima .................. 701/38 |
| 2006/0254840 A1 | 11/2006 | Strong |
| 2008/0105471 A1* | 5/2008 | Kamen et al. .................. 180/7.1 |
| 2008/0230285 A1 | 9/2008 | Bewley et al. |
| 2008/0295595 A1 | 12/2008 | Tacklind et al. |
| 2010/0090440 A1 | 4/2010 | Reichstetter et al. |
| 2011/0231085 A1* | 9/2011 | Kim et al. ................. 701/124 |

OTHER PUBLICATIONS

The Brennan Gyro-Monorail, http://www.aqpl43.dsl.pipex.com/MUSEUM/LOCOLOCO/brennan/brennan.htm.*

"The Schilovski Gyrocar"; http://www.ssees.ac.uk/archives/gle/gle11.htm; 13 pages.

"A Real Narrow-gage Railroad?"; http://www.swedetrack.com/ehist.htm; 4 pages.

"Gyrocars"; http://www.aqpl43.dsl.pipex.com/MUSEUM/TRANSORT/gyrocars/gyrocar.htm; 12 pages.

Spry, S. et al.; Lam Research Corporation; 2008; "Gyroscopic Stabilization of Unstable Vehicles: Configurations, Dynamics, and Control"; 14 pages.

* cited by examiner

ELECTROMECHANICAL STABILIZATION OF IN-LINE WHEELED VEHICLES

BACKGROUND OF THE INVENTION

The present invention relates to in-line wheeled vehicles, and more specifically to electromechanical stabilization of in-line wheeled vehicles.

Small, motorized two wheeled vehicles such as powered bicycles, mopeds, and other two wheeled vehicles are gaining popularity. With the increased use of these small, motorized two wheeled vehicles by novice riders, the risk of injury due to loss of vertical control whether traveling along a straight path or a curved path, destabilization of the vehicle is increased.

Currently, in some two wheeled in-line vehicles, gyroscopic devices are located around the hub of a steered wheel to induce a resistance to uncontrolled turns and loss of stability. The gyroscopic devices do not compensate for a loss of control at low speeds when steering into a bend or a turn to negotiate a path or road.

Alternatively, one or more gyroscopes may be used to induce a vertical stability. However, enhanced control during travel of a bend or turn, e.g. non-linear motion is not provided.

SUMMARY OF THE INVENTION

According to one embodiment of the present invention a system and method to enhance stability of in-line wheeled vehicles during vehicle motion that utilizes an inputted user adjustable sensitivity control to adjust the amount of stability control that is in place at any given time. An electromechanical gyroscopic stabilization device assists in maintaining an appropriate attack angle of the in-line wheeled vehicle while approaching and during non-linear maneuvers.

DETAILED DESCRIPTION OF THE INVENTION

Figure 1:
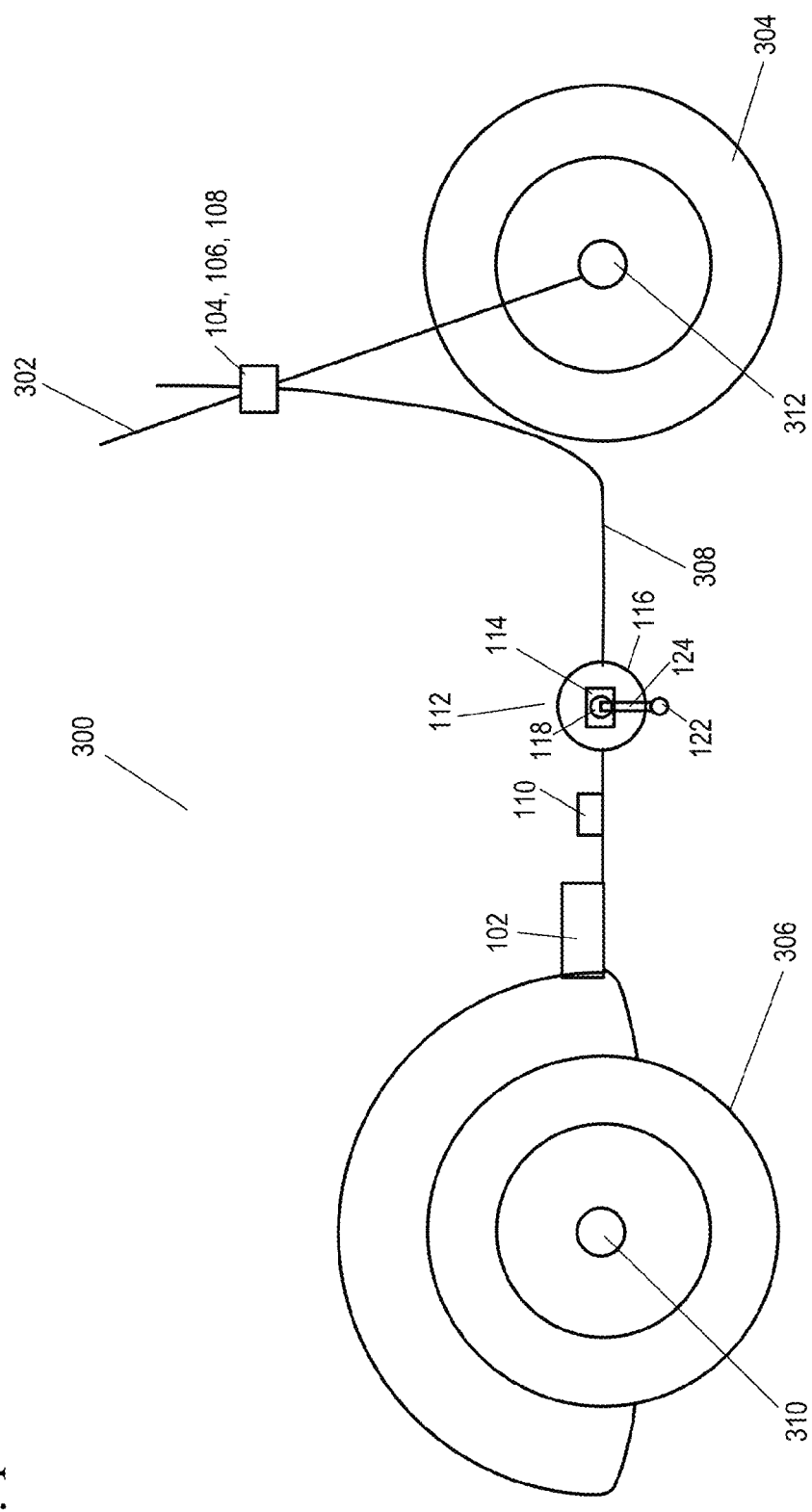
FIG. 1 shows a side view of an example of an in-line two wheeled vehicle.
Figure 2:
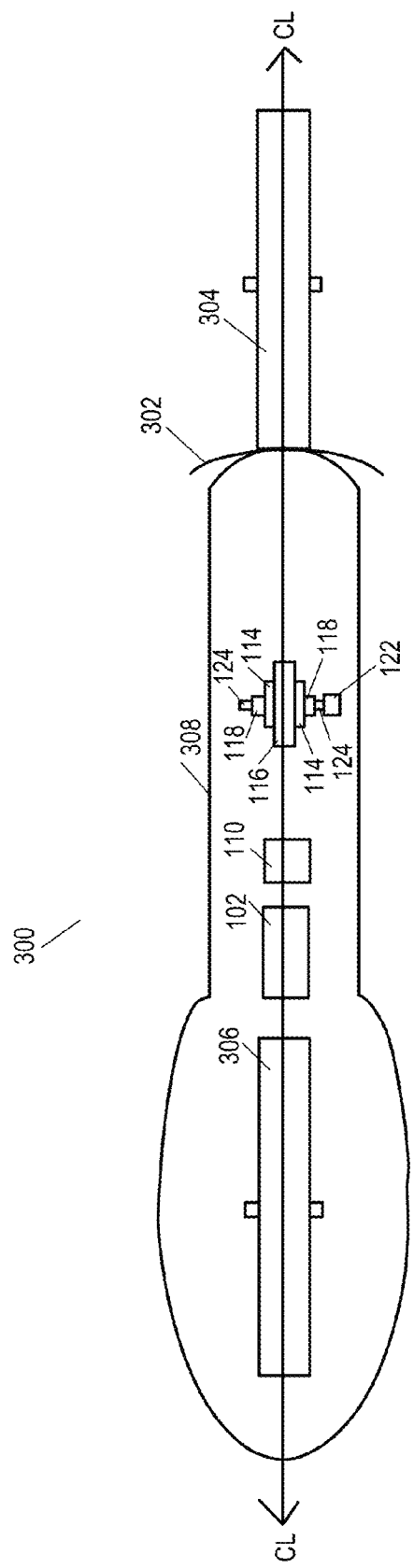
FIG. 2 shows a top view of a an example of an in-line two wheeled vehicle.

The present invention is for an electromechanical stabilization system and method to enhance stability of in-line wheeled vehicles during vehicle motions. The in-line wheeled vehicles preferably have two wheels. An example of an in-line two wheeled vehicle is shown in FIGS. 1-2. The system and method includes a computer or controller with a processor that utilizes data output from an inclinometer or a vertical offset sensor 110, data output from a steered head of a steering wheel sensor 104, data output from a speed sensor or an accelerometer 108, and an output from a user adjustable sensitivity control 106, to control an electromechanical gyroscopic stabilization device 112, which in one embodiment is preferably a single gimbaled gyroscope, to enhance lateral stability at slow forward speeds based on the selected amount of stability control set by the user operated adjustable sensitivity control 106. Data from other sensors based on other parameters such as tilt or inclinometer input showing direction and angle of lateral tilt, user weight or other parameters relating to the user or conditions of the in-line wheeled vehicle relative to a driving surface may also be used and inputted into the controller. The user adjustable sensitivity control 106 provides an electronic bias or offset against full stability as determined by the controller 102. By adjusting the user adjustable sensitivity control 106, the user can determine an upper limit to the amount of stabilization provided by the electromechanical gyroscopic stabilization device 112. The electromechanical gyroscopic stabilization device 112 assists in maintaining an appropriate attack angle of the in-line wheeled vehicle while approaching and during non-linear maneuvers at slow speeds. The controller 102, based on the input from the sensors 104, 108, 110 and the user adjustable sensitivity control 106, actively provides a level of compensation that increases as the stability of the in-line vehicle decreases. The compensation maximum and minimum are preferably solely based on the inputted user adjustable sensitivity control 106.

For example, compensation of the in-line wheeled vehicle may be initialized at a manually set compensation speed minimum between 8 and 10 miles per hour. The compensation of the in-lined wheeled vehicle increases to the manually set compensation minimum speed as speed decreases, attaining the compensation speed maximum between 4 and 5 miles per hour. It should be noted that other compensation speed maximums and minimums may be set without deviating from the heart of the invention.

The controller 102 also controls the speed of the electromechanical gyroscopic stabilization device, increasing the speed of the electromechanical gyroscopic stabilization device to provide increased stability, reducing speed of the electromechanical gyroscopic stabilization device to decrease the amount of stability provided, without the need for active control of the steered wheel of the vehicle. The active compensation is preferably limited by the manually inputted user adjustable sensitivity control 106 and not any preset compensation speed minimums or maximums.

In a preferred embodiment of the system and method of the present invention an ability to vary compensation based on rider weight or by specific adjustment to lessen or heighten compensation based on speed, vertical position, motion, whether straight or curved, or rider judgment is present. Input from the various sensors provide the appropriate amount of compensation, limited by the compensation speed maximum and minimum which are preferably solely based on the inputted user adjustable sensitivity control 106. Varying the compensation based on speed, vertical position, motion, and other parameters is preferably carried out during low speed maneuvers.

FIGS. 1-2 show side and top views of an example of an in-line two wheeled vehicle. The in-lined vehicle has two wheels, front 304 and rear 306, mounted on axles 310, 312. The axles 310, 312 are connected to an engine (not shown) mounted to the frame 308 of the vehicle. Other control features related to driving and conventional operation of the vehicle are not shown in the drawings for clarification purposes and will not be discussed, but would be known in the art. The electromechanical stabilization system is mounted on the vehicle to aid in maintaining an appropriate attack angle of the in-line wheeled vehicle while approaching and during non-linear maneuvers. During non-linear maneuvers, the gyroscope of the electromechanical gyroscopic stabilization device is titled/canted and the effective speed of the gyroscope increased to maintain balance with the vehicle in a "leaned" position as is normal during turn.

Figure 3:
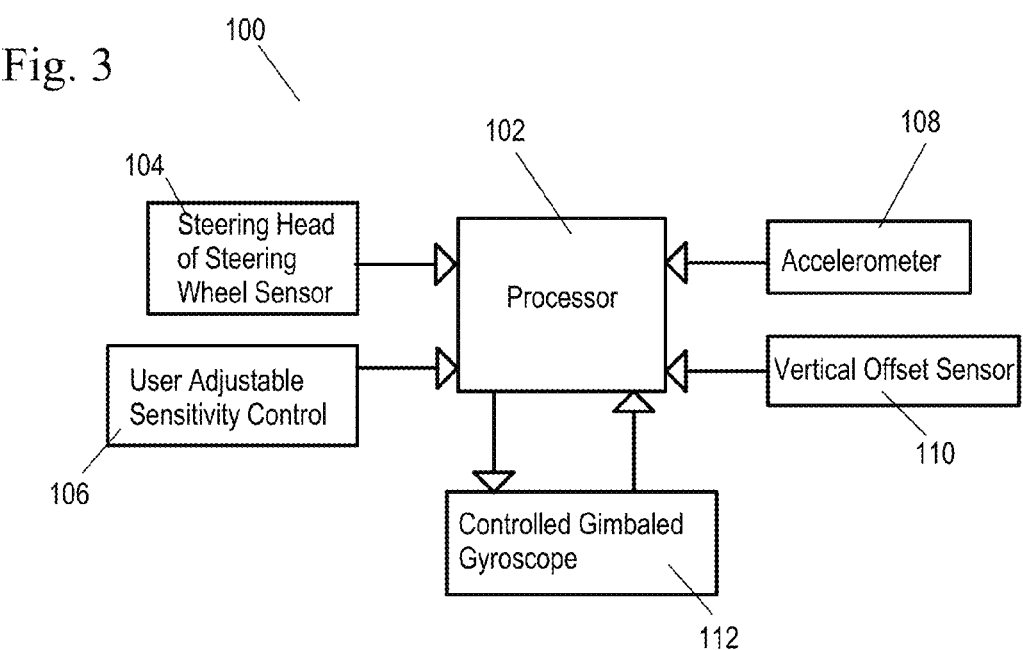
FIG. 3 shows a schematic of an electromechanical stabilization system for in-line wheeled vehicles.

A schematic of an electromechanical system for stabilization of in-line wheeled vehicles system is shown in FIG. 3. A controller or processor 102 is mounted to the frame 308 of the vehicle and has various inputs for receiving data outputs from various sensors and controls on the vehicle and provides logic control of the electromechanical stabilization system, which is preferable a single gimbaled driven gyroscopic stabilization device 112. The controller 102 preferably has a computer readable storage media and a processor. The inputs preferably include receiving output data from, but are not limited to the steering head sensor 104, an accelerometer 108, a vertical offset sensor 110, and a user adjustable stability control 106, as well as feedback input from the electromechanical gyroscopic stabilization device 112. The controller 102 reads the input from the steering head sensor 104 to receive data on the current direction of the steering wheel of the vehicle to determine in the vehicle is performing a non-linear action. The controller 102 reads and the input from the accelerometer 108 to receive acceleration or deceleration data regarding motion of the vehicle. The controller determines if the speed is sufficiently slow to allow correction, and the appropriate combination of cant and gyroscope speed against the output of the user adjustable sensitivity control 106 manually set to the compensation speed maximum and minimum. The controller reads the input from the vertical offset sensor 110 to receive data on any lateral angle change, or tilt of the vehicle. The user adjustable stability control 106 provides the controller a user defined amount of adjustment impact of the stability assist from the electromechanical gyroscopic stabilization device 112 and allows a control of the amount and reaction speed of any stabilization actions taken. The inputs of the output data from the sensors to the controller, allows the controller 102 to dynamically adjust the angle of the electromechanical gyroscopic stabilization device to impart lateral, stabilizing motion to the vehicle in an appropriate manner dependent on a line of motion that the vehicle is following. The input from the user adjustable stability control 106 is preferably stored on the computer readable storage media.

The output data from the steering head sensor 104, an accelerometer 108, a vertical offset sensor 110, and feedback input from the electromechanical gyroscopic stabilization device 112 may be stored in the computer readable storage media or inputted into the controller in real time.

Figure 4:
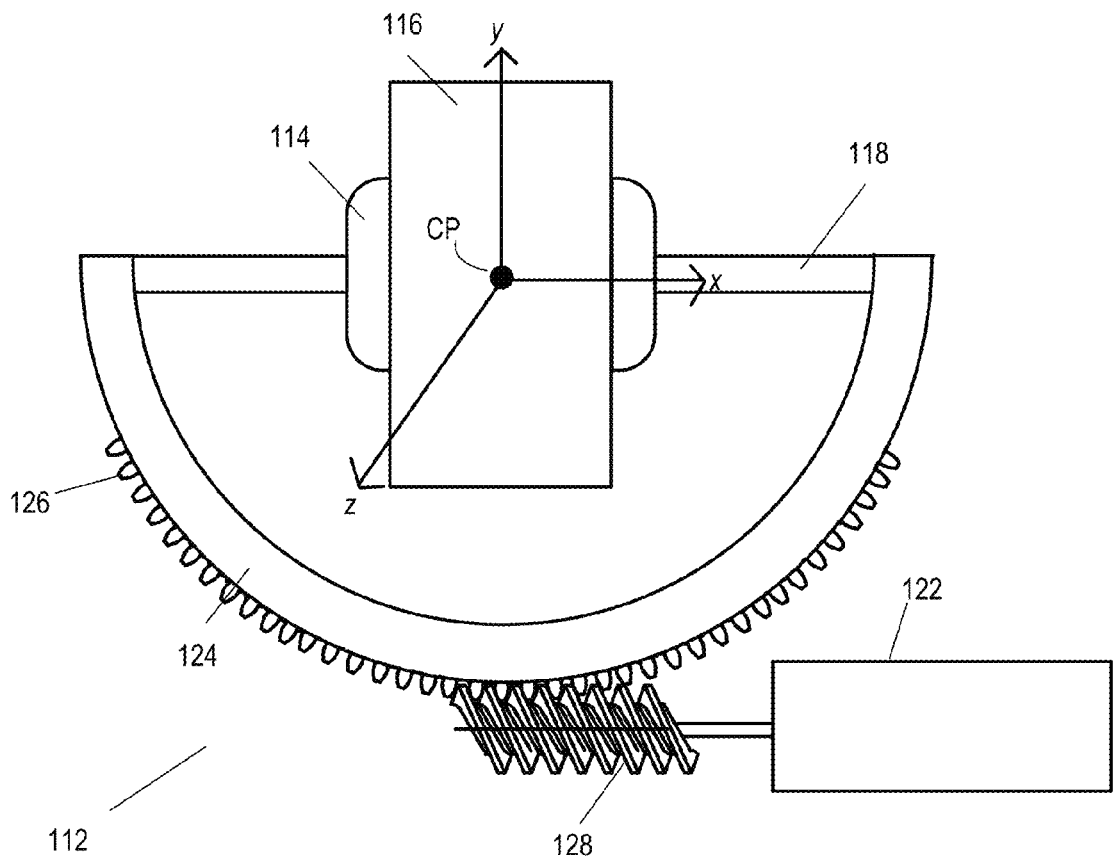
FIG. 4 shows a schematic of an electromechanical stabilization mechanism on an in-line wheeled vehicle in a first position.
Figure 5:
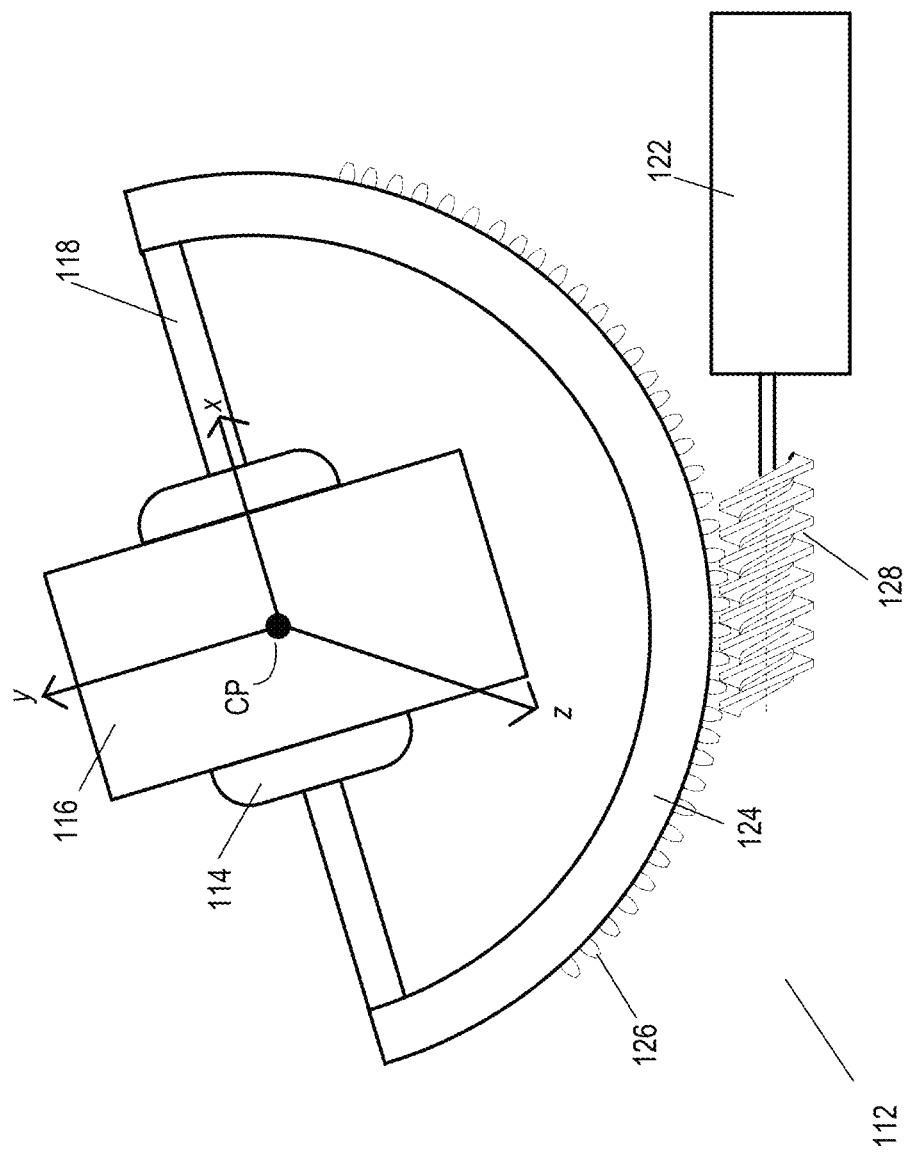
FIG. 5 shows a schematic of an electromechanical stabilization mechanism on an in-line wheeled vehicle in a second position.

The electromechanical gyroscopic stabilization device 112 is preferably mounted along a centerline CL of a horizontal axis of the vehicle of the front and rear axles 310, 312 of the front and rear tires 304, 306. A rotor 116 of the electromechanical gyroscopic stabilization device 112 is supported within a single gimbal housing 124 and a motor 114 is provided to rotate the rotor 116 about a rotor axis or spin axis x of the rotor 116 at a predetermined rate. The rotor 116 has a center point CP aligned along the centerline CL of the vehicle. The single gimbal housing 124 has rack teeth 126 along a portion of the housing that can mesh with a worm gear 128 driven by a cant motor 122. The single gimbal housing 124 is allowed to rotate about a lean axis y, which is normal to the spin axis or rotor axis x. The cant motor 122 located adjacent the single gimbal housing 124 rotates the single gimbal housing 124 and the rotor 116 about the lean axis y. By activating the cant motor and applying a torque, in this case, driving the meshing of the worm gear 128 with the rack teeth 126 on the single gimbal housing about the lean axis y results in a reaction torque about the steer axis z. The reaction torque about the steer axis z causes the rotor 116 to precess about the lean axis y, to help steer the front wheel 304 into the direction of a lean when the bike is undergoing non-linear movement as shown in FIG. 5. If no torque is applied to the single gimbal housing 124 about the lean axis y, the rotor 116 and single gimbal housing 124 remains in a neutral position as shown in FIG. 4.

The angle of the precession about the lean axis y is alterable to change the amount of lateral stabilization applied to the vehicle. While FIG. 5 shows the rotor 116 precession about the lean axis y which is to the left in the figure shown, the rotor 116 may also precess about the lean axis y to the right. The direction of the precession is dependent upon the direction in which the vehicle's front wheel 304 is leaning.

It should be noted that the center point CP of the rotor 116 remains the along the center line CL of a horizontal axis of the vehicle. The angle of the electromechanical gyroscopic stabilization device 112 may be maintained in a neutral position as shown in FIG. 4 when lateral stabilization is not needed. The direction of rotation of the rotor 116 may be the same direction of rotation or a different direction of rotation as the crankshaft of the engine of the vehicle.

Figure 6:
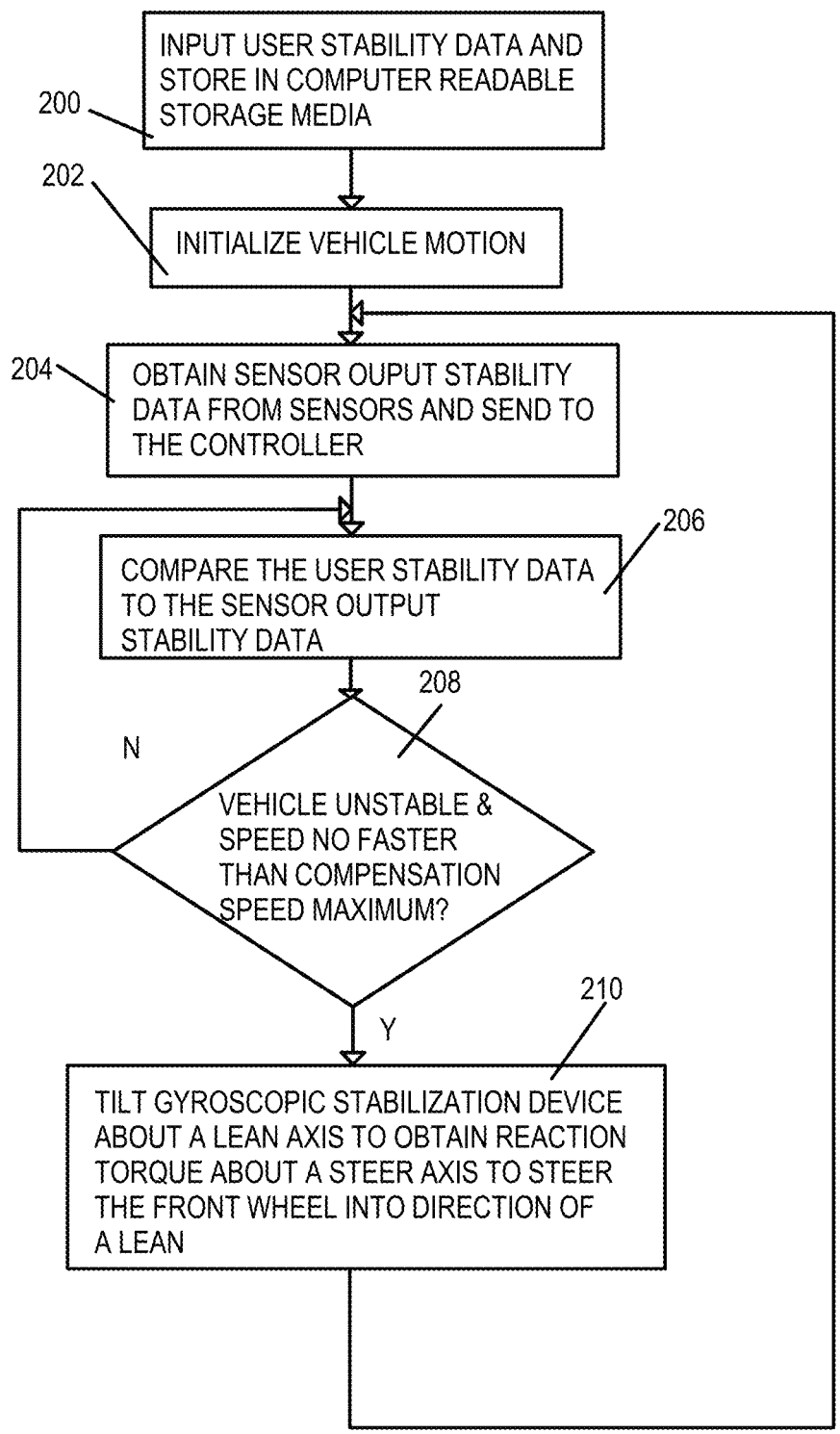
FIG. 6 shows a block diagram of stabilizing an in-line wheeled vehicle using electromechanical stabilization.

FIG. 6 shows a block diagram of the steps of stabilizing an in-line wheeled vehicle using electromechanical stabilization. A user inputs the amount of stabilization assistance required including at least a compensation speed maximum and preferably a compensation speed minimum for driving of the in-line vehicle at low speeds and the user input is stored in computer readable media storage of the controller (step 200). Then, the user initializes motion of the in-line vehicle in step 202. The controller 102 then obtains sensor output stability data from the sensors and sends the data to the controller in step 204. The processor of the controller then compares the user stability data, preferably including at least the compensation speed maximum to the sensor output stability data which preferably includes, but is not limited to position, motion, and acceleration to presets for approaching and being in non-linear maneuvers and the speed of the vehicle (step 206). If the vehicle is unstable (step 208), determined by the controller reading the various position, motion, and acceleration sensors to determine if the vehicle motion is within the corrective parameters for speed, motion, and the speed of the vehicle is no faster than the compensation speed maximum inputted from the user adjustable sensitivity control, then tilt the gyroscopic stabilization device about the lean axis y to result in a reaction torque about the steer axis z, causing the rotor to precess about the lean axis y to help steer the front wheel into the direction of a lean when the bike is undergoing non-linear movement (step 210). The tilting is preferably carried out by initiating the cant motor of the electromechanical gyroscopic stabilization device to apply a torque and in this case, driving the meshing of the worm gear 128 with the rack teeth 126 on the single gimbal housing about the lean axis y to result in a reaction torque about the steer axis z. The reaction torque about the steer axis z causes the rotor 116 to precess about the lean axis y, to help steer the front wheel into the direction of a lean when the bike is undergoing non-linear movement. After the reaction torque about the steer axis z causes the rotor 116 to precess about the lean axis y, to help steer the front wheel into the direction of a lean when the bike is undergoing non-linear movement, return to the step of the controller obtaining sensor output stability data from the sensors and sending the data to the controller (step 204).

In an alternate embodiment, the compensation speed minimum would also be considered in step 208 and step 210 if the speed of the vehicle is slower than the compensation speed minimum, no faster than the compensation speed maximum and the vehicle is unstable.

If the vehicle is stable and the speed of the vehicle is faster than the compensation speed maximum inputted from the user adjustable sensitivity control, then return to the step of the comparing the user stability data, preferably including at least the compensation speed maximum to the sensor output stability data which preferably includes, but is not limited to position, motion, and acceleration to presets for approaching and being in non-linear maneuvers and the speed of the vehicle (step 206).

One embodiment of the invention is implemented as a program product for use with a computer system such as, for example, the schematic diagram of FIG. 3 and FIG. 6 described below. The program(s) of the program product defines functions of the embodiments and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); (iii) the memory of a vehicle controller such as EPROM or (iv) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, whether implemented as part of an operating system or a specific application, component, program, module, object, or sequence of instructions may be referred to herein as a "program". The computer program typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for stabilizing an in-line wheeled vehicle during or approaching non-linear movements on a driving surface, the vehicle comprising at least one front wheel in-line with at least one rear wheel; a gyroscopic stabilization device mounted on the in-line wheeled vehicle; and a computer coupled to the gyroscopic stabilization device, the method comprising:
   the computer determining if a current speed of the vehicle is less than or equal to a user specified maximum speed at which the computer is permitted to attempt to stabilize the vehicle; and
   if the vehicle is not currently stable and the current vehicle speed is less than the user-specified maximum, the computer initiating the gyroscopic stabilization device to aid in steering the front wheel into a direction of a lean during a non-linear movement.

2. The method of claim 1, wherein the step of if the vehicle is not currently stable and the current vehicle speed is less than the user-specified maximum, the computer initiating the gyroscopic stabilization device to aid in steering the front wheel into a direction of a lean during a non-linear movement further comprises:
   tilting the gyroscopic stabilization device about a lean axis, such that a reaction torque about a steer axis causes a rotor of the gyroscopic stabilization device to precess about the lean axis, aiding in steering the front wheel into the direction of the lean when the vehicle is in or approaching non-linear movement.

3. The method claim 2, wherein tilting of the gyroscopic stabilization device about a lean axis, such that a reaction torque about a steer axis causes a rotor of the gyroscopic stabilization device to precess about the lean axis, aiding in steering the front wheel into the direction of the lean when the vehicle is in or approaching non-linear movement is carried out by initiating a cant motor of the gyroscopic stabilization device driving a meshing of a worm gear with rack teeth on a single gimble housing of the gyroscopic stabilization device.

4. The method of claim 1, further comprising the computer receiving user stability data specifying at least a specified maximum speed at which the computer is attempted to stabilize the vehicle and storing the data on the computer.

* * * * *